United States Patent

Runger

(10) Patent No.: US 9,410,658 B2
(45) Date of Patent: Aug. 9, 2016

(54) PROJECTOR ADJUSTMENT MECHANISM

(71) Applicant: Ergotron, Inc., St. Paul, MN (US)

(72) Inventor: George Runger, Eagan, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 14/477,158

(22) Filed: Sep. 4, 2014

(65) Prior Publication Data

US 2015/0060625 A1    Mar. 5, 2015

Related U.S. Application Data

(60) Provisional application No. 61/874,037, filed on Sep. 5, 2013.

(51) Int. Cl.

| | |
|---|---|
| *A47B 96/00* | (2006.01) |
| *A47K 1/00* | (2006.01) |
| *A47K 5/00* | (2006.01) |
| *F21V 21/00* | (2006.01) |
| *F21V 35/00* | (2006.01) |
| *F16L 3/08* | (2006.01) |
| *F16M 11/04* | (2006.01) |

(Continued)

(52) U.S. Cl.
CPC ............. *F16M 11/043* (2013.01); *F16M 11/08* (2013.01); *F16M 11/12* (2013.01); *F16M 13/02* (2013.01); *F16M 13/022* (2013.01); *F16M 13/027* (2013.01); *G03B 21/145* (2013.01); *G03B 21/54* (2013.01)

(58) Field of Classification Search
CPC ....... F16M 11/12; F16M 11/18; F16M 13/02; F16M 11/2092; F16M 11/04; F16M 11/043; F16M 11/2035; F16M 11/123; G03B 21/54; G03B 21/145

USPC ........ 248/274.1, 286.1, 287.1, 317, 320, 323, 248/324, 337, 340, 342, 343, 344, 346.06, 248/371, 519, 327; 362/259, 253, 243, 242
See application file for complete search history.

(56) References Cited

U.S. PATENT DOCUMENTS

| | | | |
|---|---|---|---|
| 2,643,844 | A | 6/1953 | Nette |
| 3,516,628 | A | 6/1970 | Kendall |

(Continued)

FOREIGN PATENT DOCUMENTS

| | | |
|---|---|---|
| CN | 202228878 U | 5/2012 |
| CN | 202327583 U | 7/2012 |

(Continued)

OTHER PUBLICATIONS

"International Application Serial No. PCT/US2014/025624, International Search Report mailed Aug. 22, 2014", 5 pgs.

(Continued)

*Primary Examiner* — Jonathan Liu
*Assistant Examiner* — Muhammad Ijaz
(74) *Attorney, Agent, or Firm* — Schwegman Lundberg & Woessner, P.A.

(57) ABSTRACT

In one example, a device for mounting and adjusting an electronic device is described. The device can include a mounting frame, an elongated shaft connected to the mounting frame, a curved arm for operatively connecting to an electronic device and slidably engaging with the shaft, and a threaded knob configured for threadable engagement with the curved arm.

13 Claims, 3 Drawing Sheets

(51) Int. Cl.
*F16M 13/02* (2006.01)
*F16M 11/08* (2006.01)
*F16M 11/12* (2006.01)
*G03B 21/54* (2006.01)
*G03B 21/14* (2006.01)

(56) References Cited

U.S. PATENT DOCUMENTS

| | | | | |
|---|---|---|---|---|
| 3,731,897 A * | 5/1973 | Price | F16M 13/02 | 248/229.1 |
| D302,697 S * | 8/1989 | Parrish | | 396/428 |
| 5,037,267 A | 8/1991 | Warner et al. | | |
| 5,181,686 A * | 1/1993 | Barthel | F26B 25/18 | 248/173 |
| 5,271,592 A | 12/1993 | Ludwig | | |
| 5,312,121 A | 5/1994 | Chapman | | |
| 6,121,737 A | 9/2000 | Guenther et al. | | |
| 6,485,144 B1 * | 11/2002 | Liao | G03B 21/00 | 348/151 |
| 6,691,965 B1 * | 2/2004 | Lin | B60J 1/2063 | 248/274.1 |
| 7,190,586 B2 * | 3/2007 | Franz | H01L 23/4093 | 165/185 |
| 7,301,774 B2 * | 11/2007 | Lee | H01L 23/4006 | 165/80.2 |
| D560,669 S * | 1/2008 | Muday | | D14/451 |
| 7,891,624 B2 * | 2/2011 | Dittmer | F16M 11/04 | 248/292.12 |
| 7,969,742 B2 * | 6/2011 | Liu | H01L 23/4006 | 165/104.33 |
| 8,221,399 B2 | 7/2012 | Amano | | |
| 8,345,154 B2 * | 1/2013 | Zhan | F16M 11/041 | 348/373 |
| 9,004,430 B2 | 4/2015 | Conner | | |
| 2003/0234335 A1 | 12/2003 | Umberg | | |
| 2005/0161575 A1 * | 7/2005 | Friederich | F16M 11/04 | 248/519 |
| 2005/0236546 A1 * | 10/2005 | O'Neill | F16M 11/04 | 248/317 |
| 2006/0061738 A1 * | 3/2006 | Rizzo | F16M 11/04 | 353/119 |
| 2006/0186301 A1 * | 8/2006 | Dozier | F16M 11/04 | 248/371 |
| 2006/0261227 A1 * | 11/2006 | Petrick | F16M 11/02 | 248/276.1 |
| 2007/0034765 A1 * | 2/2007 | Lo | F04D 296/668 | 248/343 |
| 2008/0061200 A1 * | 3/2008 | Bouissiere | F16M 11/04 | 248/206.5 |
| 2009/0294619 A1 * | 12/2009 | David | F16M 11/04 | 248/324 |
| 2009/0316118 A1 * | 12/2009 | Dittmer | F16M 11/04 | 353/119 |
| 2010/0237210 A1 * | 9/2010 | Anderson | F16M 11/04 | 248/274.1 |
| 2011/0297809 A1 * | 12/2011 | Bouissiere | F16M 11/043 | 248/274.1 |
| 2012/0320596 A1 | 12/2012 | Hastings | | |
| 2013/0048819 A1 * | 2/2013 | Hung | F16M 11/12 | 248/286.1 |
| 2014/0299738 A1 * | 10/2014 | Runger | F16M 11/12 | 248/661 |

FOREIGN PATENT DOCUMENTS

| | | |
|---|---|---|
| EP | 1852646 A2 | 11/2007 |
| WO | WO-2014160011 A1 | 10/2014 |
| WO | WO-2015035009 A1 | 3/2015 |

OTHER PUBLICATIONS

"International Application Serial No. PCT/US2014/025624, Written Opinion mailed Aug. 22, 2014", 6 pgs.

"International Application Serial No. PCT/US2014/054035, International Search Report mailed Feb. 13, 2015", 5 pgs.

"International Application Serial No. PCT/US2014/054035, Written Opinion mailed Feb. 13, 2015", 4 pgs.

"U.S. Appl. No. 14/208,177, Non Final Office Action mailed Dec. 1, 2015", 8 pgs.

"U.S. Appl. No. 14/208,177, Preliminary Amendment filed May 30, 2014", 3 pgs.

"U.S. Appl. No. 14/208,177, Response filed Nov. 13, 2015 to Restriction Requirement mailed Sep. 15, 2015", 8 pgs.

"U.S. Appl. No. 14/208,177, Restriction Requirement mailed Sep. 15, 2015", 7 pgs.

"International Application Serial No. PCT/US2014/025624, International Preliminary Report on Patentability mailed Sep. 24, 2015", 8 pgs.

* cited by examiner

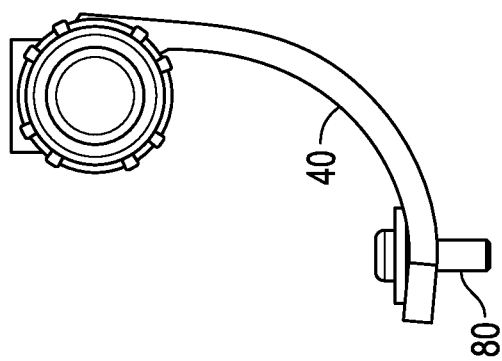
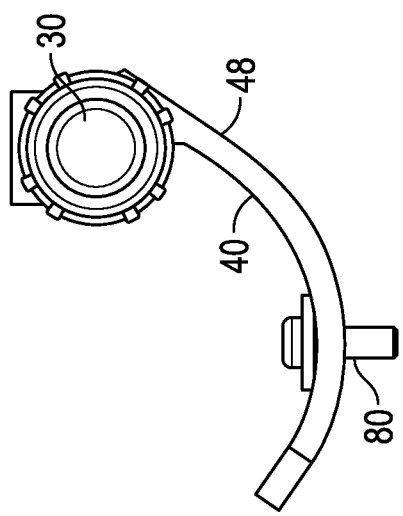
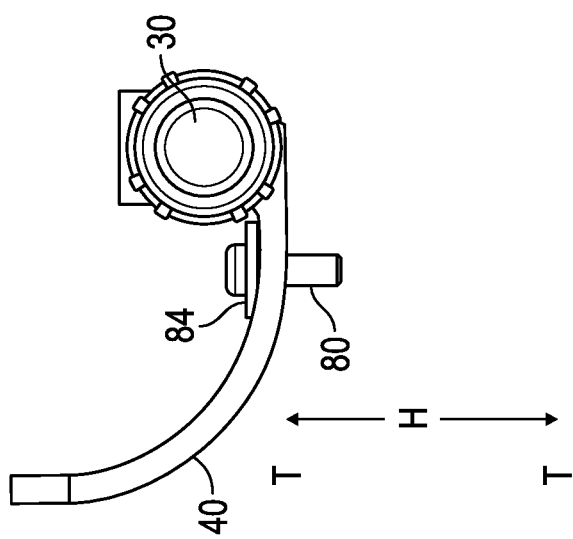

PROJECTOR ADJUSTMENT MECHANISM

This application is related to U.S. Provisional Application No. 61/874,037 titled, "PROJECTOR ADJUSTMENT MECHANISM" to George Runger, and filed on Sep. 5, 2013, the entire content being incorporated herein by reference, and the benefit of priority being claimed herein.

TECHNICAL FIELD

This disclosure generally relates to systems and methods for mounting electronic devices.

BACKGROUND

Electronic projectors are generally devices used to project an image onto a vertical surface, such as a screen or wall. They are often hung from ceilings or placed on a support surface such as a desk.

SUMMARY

Embodiments of the invention include a device for mounting and adjusting an electronic device. In some embodiments, the device can include a mounting frame, an elongated shaft connected to the mounting frame, a curved arm slidably engaged with the shaft and operatively connectable to the electronic device, and a threaded knob. In some embodiments, the curved arm can include a distal end and a proximal end. The proximal end of the curved arm can have a threaded section. In some embodiments, the threaded knob can include a distal end and a proximal end. The proximal end of the threaded knob can have a threaded section configured for engagement with the threaded section of the arm. In some embodiments, the curved arm and/or knob can be configured to receive at least a portion of a spacer. Embodiments of the invention also include methods of using such mounting systems.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

FIG. 5A is a top plan view of a curved arm of a device for mounting and adjusting an electronic device at a first rotational position in accordance with an embodiment of the invention.

FIG. 5B is a top plan view of a curved arm of a device for mounting and adjusting an electronic device at a second rotational position in accordance with an embodiment of the invention.

FIG. 5C is a top plan view of a curved arm of a device for mounting and adjusting an electronic device at a third rotational position in accordance with an embodiment of the invention.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
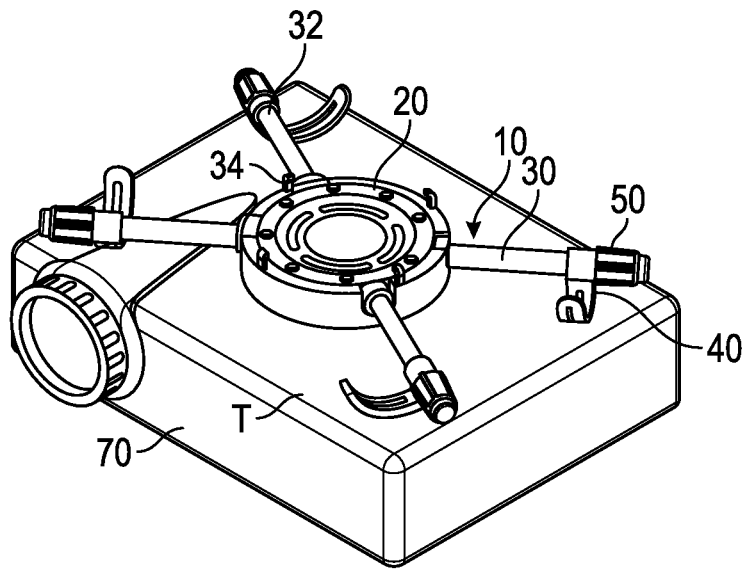
FIG. 1 is a perspective view of a device for mounting and adjusting an electronic device in accordance with an embodiment of the invention.
Figure 2A:
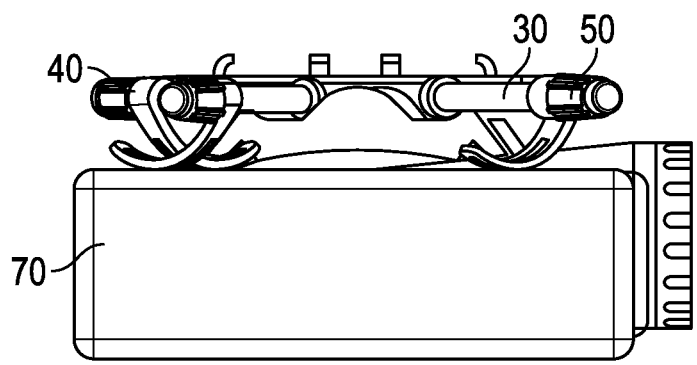
FIGS. 2A and 2B are side plan views of a device for mounting and adjusting an electronic device in accordance with an embodiment.
Figure 2B:
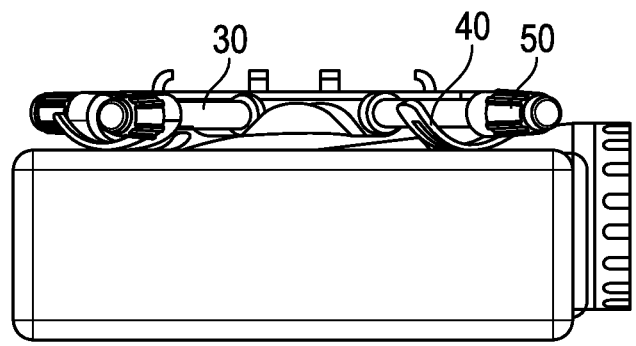

FIG. 1 is a perspective view of a device 10 for mounting and adjusting an electronic device in accordance with an embodiment of the invention. Embodiments of the device 10 can include a mounting frame 20 adapted to be attached to a surface, such as a horizontal surface (e.g., a ceiling), an elongated shaft 30, a curved arm 40, and a threaded knob 50 as perhaps best seen in FIGS. 2A-2B. Such a system is useful, for example, for adjustably mounting an electronic device to a surface.

As shown, the elongated shaft 30 can have a distal end 32 and a proximal end 34. The proximal end 34 of the elongated shaft 30 can be connected to the mounting frame 20. In some embodiments, the curved arm 40 can include a distal end 42 and a proximal end 44. The distal end 42 of the curved arm can be operatively connected to the electronic device. The proximal end 44 can be fitted over the shaft 30 and have a threaded section, such as on an internal surface. In some embodiments, the threaded knob 50 can include a distal end (not labeled) and a proximal end 54 which can be fitted over the shaft 30. The proximal end 54 can have a threaded section, such as on an external surface of the threaded knob 50. The threaded section of the threaded knob 50 can matingly engage with the threaded section of the curved arm 40. Although embodiments of the invention are shown and described having the threads on the curved arm 40 on an internal surface and the threads on the knob 50 on an external surface, it should be noted that these positions could be reversed.

Figure 3:
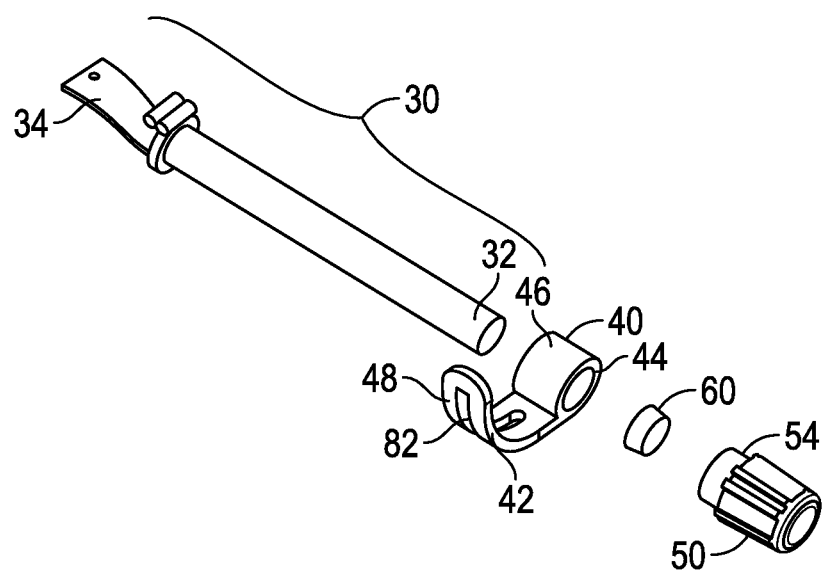
FIG. 3 is an exploded perspective view of a device for mounting and adjusting an electronic device in accordance with an embodiment of the invention.
Figure 4:
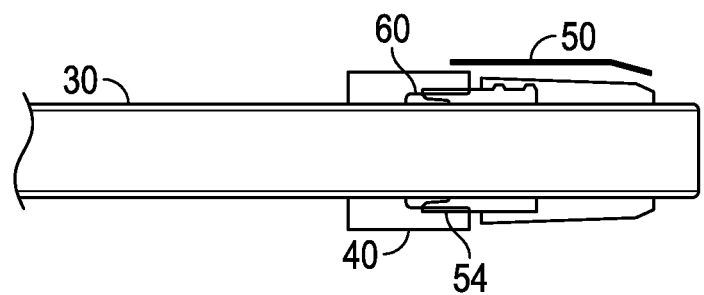
FIG. 4 is a front elevation cross-sectional view of a device for mounting and adjusting an electronic device in accordance with an embodiment of the invention showing certain elements in detail.

In some embodiments, the curved arm 40 can be configured to receive a spacer 60 as seen in FIG. 3. The spacer 60 can have a shape corresponding to at least a portion of a cone. Such a shape can increase the compressive forces acting on the shaft as the knob and the arm are threadingly engaged and act on the spacer. The spacer 60 can provide a frictional engagement between the shaft 30, the curved arm 40 and the threaded knob 50 when it is compressed by threaded engagement of the knob and the arm. As seen in FIG. 4, the mating engagement between the threaded sections of the threaded knob 50 and the curved arm 40 creates a clamping force between the curved arm 40 and the shaft 30 via the spacer 60. In certain embodiments, the curved arm 40 may be positionable along a length the shaft at an infinite number of positions between the proximal end 34 and distal end 32 of the shaft 30. Such an embodiment is useful for accommodating electronic devices of different sizes and a variety of mounting locations.

In some embodiments, the electronic device can be a projector 70. The projector 70 can be configured to be mounted to a bottom of a generally horizontal surface, such as a ceiling panel or a desk, by a mounting system as described herein. The curved arm 40 can be adapted to connect to a top surface "T" of the projector 70. The curved arm 40 frictionally engages with the shaft 30 when threadably engaged with the threaded knob 50. The frictional engagement between the curved arm 40 and shaft 30 can limit undesired sliding and/or rotational movement of the curved arm along a length of the shaft between the proximal end 34 and distal end 32 of the shaft 30.

The frictional engagement between the curved arm 40 and shaft 30 can also limit rotational movement of the curved arm about the shaft. In some embodiments, a rotation of the threaded knob 50 rotates the curved arm 40 about the shaft 30 to a desired rotational position. A rotational movement of the curved arm 40 about the shaft 30 raises or lowers the portion of the projector 70 when the arm is attached to a projector. In some embodiments, the curved arm 40 can be rotationally positionable at an infinite number of positions about the shaft 30 between 0 degrees and 360 degrees. In FIGS. 5A-5C, three rotational positions of the curved arm 40 are shown. The height "H" of the top surface "T" of the projector 70 from an external horizontal surface (not shown) can therefore be adjusted by adjusting the rotational position of the curved arm 40. Such embodiments are useful for accommodating irregular mounting surfaces.

In some embodiments, the curved arm 40 (e.g., its proximal end) can include a hollow cylinder 46 for receiving at least a portion of the shaft 30. In some embodiments, the curved arm 40 (e.g., its distal end) can include an arcuate wall 48 extending tangentially from an external surface of the hollow cylinder 46 (labeled in FIG. 3). As seen in FIGS. 5A-5C, the arcuate wall 48 can be adapted to receive at least a portion of a fastening device 80 (e.g.: screw, bolt, and nut assembly). The arcuate wall 48 can include an opening 82 (labeled in FIG. 3) extending its length. The opening 82 can receive at least a portion of the fastening device 80. The fastening device 80 can extend through the opening 82 for attaching the curved arm 40 and at least a portion of the electronic device to each other. In some embodiments, a washer 84 adapted to receive the fastening device 80 can be included. The washer 84 can have an arcuate profile adapted to remain in contact with the arcuate wall 48 of the curved arm 40.

In some embodiments the device 10 can include a plurality of elongated shafts 30 located symmetrically about an axis of the device. Each of the plurality of the elongated shafts 30 can fixedly attach to the mounting frame 20. In such an embodiment, the device 10 can include a plurality of curved arms 40, each slidably engaging with an external surface of a corresponding shaft 30. A plurality of spacers 60 at least a portion of each of which can be received by a corresponding curved arm 40. The device 10 can include a plurality of threaded knobs 50, each comprising a proximal end 54 having a threaded section on an external surface. The threaded section of each of the threaded knobs 50 can be configured for engagement with the threaded section of the corresponding arm 40.

The device 10 as shown in FIGS. 1-5 can include four elongated shafts, correspondingly engaging with four curved arms, four spacers and four threaded knobs. Each of the four elongated shafts can be positioned symmetrically about an axis of the device 10. Each of the four curved arms can be positionable along a length of the shaft at an infinite number of positions between the proximal and distal end of the shaft independent of the other of the four curved arms. Each of the four curved arms can be rotationally positionable at an infinite number of positions about the shaft between 0 degrees and 360 degrees independently of the other of the four curved arms.

Embodiments of the invention also include methods of using any of the mounting systems described herein. Methods in accordance with embodiments of the invention can include one or more of the following steps: providing a mounting system; moving an arm along a length of a shaft to a desired longitudinal position; rotating an arm about a shaft to a desired radial position; and/or fixing the desired longitudinal and radial positions of the arm with respect to the shaft.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

The invention claimed is:

1. A device for mounting and adjusting an electronic device, comprising:
    a mounting frame;
    a plurality of straight, tubular elongated shafts located symmetrically about an axis of the device, each of the plurality of the tubular elongated shafts fixedly attached to the mounting frame, each shaft having a longitudinal axis, each shaft comprising:
        a distal end; and
        a proximal end connected to the mounting frame;
    a plurality of curved arms configured to mount to the electronic device, each arm including a distal end and a proximal end, the proximal end of each of the plurality of curved arms including a hollow cylinder configured to receive a least a portion of a corresponding shaft extending therethrough, the proximal end of each of the plurality of curved arms configured to slidably engage with an external surface of the corresponding tubular elongated shaft, the distal end of each of the plurality of curved arms operatively connectable to the electronic device, the proximal end of each of the plurality of curved arms having a threaded section, the distal end of each curved arm comprising an arcuate portion extending outward from an external surface of the hollow cylinder, the arcuate portion comprising an opening extending along a length thereof, each curved arm configured to receive at least a portion of a corresponding spacer, each curved arm configured to slidably engage with the corresponding tubular elongated shaft;
    a plurality of threaded knobs, each knob comprising a distal end and a proximal end, the proximal end of each of the plurality of threaded knobs, having a threaded section configured for engagement with the threaded section of the corresponding curved arm, each knob positioned at the distal end of the corresponding tubular elongated shaft, and each knob configured to rotate about the longitudinal axis of the corresponding tubular elongated shaft,
    wherein a rotation of one of the threaded knobs permits rotation of the corresponding curved arm about the longitudinal axis of the corresponding tubular elongated shaft, and wherein the rotation of the corresponding curved arm about the elongated axis of the corresponding tubular elongated shaft raises or lowers the portion of the electronic device attached thereto, and wherein each of said threaded knob, hollow cylinder, and elongated shaft are axially aligned with respect to the longitudinal axis of the corresponding elongated shaft.

2. The device of claim 1, wherein the opening of each arcuate portion is configured for passage of at least a portion of a fastening device extending therethrough for attaching the corresponding curved arm and at least a portion of the electronic device to each other.

3. The device of claim 2, further comprising a washer adapted to receive the fastening device, wherein the washer has an arcuate profile adapted to remain in contact with the arcuate wall of the corresponding curved arm.

4. The device of claim 1, wherein the spacer has a shape corresponding to at least a portion of a cone, the spacer configured to provide a frictional engagement between the corresponding tubular elongated shaft, tire corresponding curved arm and tire corresponding threaded knob.

5. The device of claim 1, further comprising:
a plurality of spacers, wherein at least a portion of each of the plurality of the spacers received by a corresponding curved arm.

6. The device of claim 1, wherein the plurality of tubular elongated shafts, curved arms, and threaded knobs include four tubular elongated shafts, correspondingly engaging with four curved arms, and four threaded knobs, each of the four tubular elongated shafts positioned symmetrically about an axis of the device.

7. The device of claim 6, wherein each of the four curved arms is positionable along a length of the shaft at positions between the proximal and distal end of the shaft independent of the other of the four curved arms.

8. The device of claim 6, wherein each of the four curved arms is rotationally positionable at positions about the shaft between 0 degrees and 360 degrees independently of the other of the four curved arms.

9. The device of claim 1, wherein the electronic device is a projector configured to be mounted to a bottom of a generally horizontal surface.

10. The device of claim 9, wherein the plurality of curved arms are adapted to connect to a top surface of the projector.

11. The device of claim 1, wherein each of the curved arms frictionally engages with the corresponding tubular elongated shaft, the frictional engagement exclusively limiting slidable movement of the curved arm along a length of the tubular elongated shaft between the proximal and distal end of the tubular elongated shaft.

12. The device of claim 1, wherein the threaded section on the curved arm is on an internal surface of the curved arm.

13. The device of claim 12, wherein the threaded section on the threaded knob is on an external surface of the threaded knob.

* * * * *